United States Patent
Hosoe et al.

(10) Patent No.: US 7,799,447 B2
(45) Date of Patent: Sep. 21, 2010

(54) PERPENDICULAR MAGNETIC RECORDING MEDIUM HAVING GRAIN BOUNDARY LAYER CONTAINING FERROMAGNETIC ELEMENT

(75) Inventors: Yuzuru Hosoe, Tokyo (JP); Atsushi Nakamura, Tokyo (JP); Yoshio Takahashi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1167 days.

(21) Appl. No.: 11/258,642

(22) Filed: Oct. 25, 2005

(65) Prior Publication Data

US 2006/0088733 A1    Apr. 27, 2006

(30) Foreign Application Priority Data

Oct. 27, 2004  (JP) ............................. 2004-311733

(51) Int. Cl.
   *G11B 5/66* (2006.01)
(52) U.S. Cl. ...................................................... 428/836
(58) Field of Classification Search ........................ None
   See application file for complete search history.

(56) References Cited

U.S. PATENT DOCUMENTS

| 5,652,054 A | 7/1997 | Kikitsu et al. |
| 6,524,730 B1 * | 2/2003 | Chen .................... 428/811.3 |
| 6,899,964 B2 * | 5/2005 | Nakamura et al. ........ 428/832.1 |
| 7,056,606 B2 * | 6/2006 | Shimizu et al. .......... 428/832.1 |
| 7,429,427 B2 * | 9/2008 | Wu et al. .................. 428/836.2 |
| 2003/0099866 A1 | 5/2003 | Takahashi et al. |
| 2004/0191576 A1 | 9/2004 | Shimizu et al. |

FOREIGN PATENT DOCUMENTS

| EP | 0 817 174 A1 | 1/1998 |
| JP | 08-083418 | 3/1996 |
| JP | 10-079307 | 3/1998 |
| JP | 2000-306228 | 11/2000 |
| JP | 2002-358615 | 12/2002 |
| JP | 2003-178413 | 6/2003 |
| JP | 2004-063054 | 2/2004 |

* cited by examiner

Primary Examiner—Holly Rickman
(74) Attorney, Agent, or Firm—Zilka-Kotab, PC

(57) ABSTRACT

Embodiments of the invention ensure that a perpendicular magnetic recording medium having a granular magnetic recording layer made of CoCrPt alloy and Si oxide provides both high SNR and thermal stability. In one embodiment, a substantially amorphous grain boundary layer of a magnetic recording layer made of CoCrPt alloy and Si oxide contains a ferromagnetic element in a concentration from about 30 at. % to 50 at. % or more preferably from about 35 at. % to 47 at. %, so that intergrain exchange interaction takes place moderately. As a consequence, SNR of 18 dB or more and thermal stability of 3%/decade or less are achieved.

19 Claims, 4 Drawing Sheets

PERPENDICULAR MAGNETIC RECORDING MEDIUM HAVING GRAIN BOUNDARY LAYER CONTAINING FERROMAGNETIC ELEMENT

CROSS-REFERENCES TO RELATED APPLICATIONS

This application claims priority from Japanese Patent Application No. JP2004-311733, filed Oct. 27, 2004, the entire disclosure of which is incorporated herein by reference.

BACKGROUND OF THE INVENTION

The present invention relates to a magnetic recording medium which is used in a magnetic recording apparatus such as a hard disk drive and more particularly to a perpendicular magnetic recording medium which is used in a recording system which records magnetization almost perpendicular to a substrate surface.

Currently the mainstream in recording systems for use in hard disk drives is a longitudinal recording system in which magnetization is recorded along the substrate in-plane direction. However, in order to realize a higher recording density, or a larger capacity hard disk drive, research has been actively conducted on perpendicular recording in which magnetization is oriented perpendicularly to the substrate. A recording medium which is used for perpendicular magnetic recording has a magnetic easy axis oriented almost perpendicularly to the substrate and consists of a magnetic recording layer for holding record, a soft magnetic layer for efficient use of the magnetic field of a magnetic head and so on. In perpendicular recording, since magnetization in boundaries (magnetization transition regions) of recorded magnetization regions is antiparallel, magnetic stability is ensured and the width of the so-called "zigzag magnetic domain wall" is small and therefore medium noise is reduced. The soft magnetic layer not only functions as a return path for the magnetic head's magnetic field; but when it is used with a single pole head, it generates a strong magnetic field in the magnetic recording layer due to a mirror effect, which makes it possible to use a recording magnetic film with a high coercivity and thus improves thermal stability in recorded magnetization.

It has been thought that as a condition for a fine structure of medium for reduction in medium noise of a perpendicular recording medium, the grain size of crystal grains must be very small and exchange interaction between neighboring crystal grains must be small. The reason for this is that because a unit of magnetization reversal is one crystal grain as a constituent of a magnetic recording layer or a combination of plural crystal grains, the width of the magnetization transition region largely depends on the size of this unit of magnetization reversal. However, there was a problem that an extremely small grain size might lower thermal stability of grains and even a thermal energy equivalent to room temperature might cause reversal of magnetization, namely demagnetization, with a high probability. Hence, regarding conventional perpendicular magnetic recording media, research and development has been pursued to increase the magnetic distance between grains while holding grain boundaries nonmagnetic under the policy that intergrain interaction should be reduced while the grain size is held at about 10 μm. In order to achieve this, a so-called "granular" structure magnetic recording medium in which the peripheries of magnetic crystal grains (crystal grain boundaries) are surrounded by non-magnetic layers for the purpose of reducing interaction between crystal grains has been proposed and developed. For example, JP-A No. 358615/2002 discloses a granular magnetic recording medium with an average intergrain distance of 1.0 nm or more. This disclosure document describes that the medium uses an oxide, nitride, fluoride or carbide for a grain boundary layer. Also, JP-A No. 178413/2003 discloses a granular magnetic recording medium which uses an oxide for a non-magnetic layer which constitutes a grain boundary layer where the volume of oxide contained in a magnetic recording layer is specified to ensure a high coercivity. For comparison, when a magnetic recording medium used in a longitudinal recording system uses CoCrPt alloy for its magnetic recording layer, a granular structure can be made without addition of an oxide or the like and intergrain interaction can be reduced in a relatively adequate manner because a non-magnetic element such as Cr can be segregated in grain boundaries. On the other hand, when only CoCrPt alloy is used for the magnetic recording layer of a perpendicular recording medium, segregation of Cr in grain boundaries hardly occurs and it is difficult to make a sufficiently segregated grain boundary structure, or a granular structure. Therefore, in perpendicular recording media, grain boundary formation has been stimulated by addition of an oxide to make a granular structure for noise reduction.

BRIEF SUMMARY OF THE INVENTION

Even for this type of granular perpendicular medium, in order to increase the medium SNR (signal to noise ratio), it is necessary to decrease the grain size of magnetic crystal grains. The grain size of granular perpendicular media varies according to substrate temperature and many parameters in the process of making magnetic crystal grains such as sputter gas pressure, oxygen concentration in sputter gas and grain boundary volume. Hence, in order to obtain a desired crystal grain size, it is necessary to control not one of the above formation conditions but plural conditions properly. The crystal grain size can be accurately measured by observation through a transmission electron microscope and its variation under different grain formation conditions can be easily known. For example, it is confirmed that when the oxygen concentration in sputter gas increases, the crystal grain size abruptly decreases.

However, as mentioned above, if the crystal grain size for the magnetic recording layer is extremely decreased for noise reduction, thermal stability, namely resistance to decay of recorded magnetization over time, will deteriorate. For example, for information recorded in a magnetic recording layer with a grain size of 6.2 nm, a film thickness of 20 nm and a uniaxial magnetic anisotropy constant of 22.4 kJ/m$^3$, SNR is 25 dB or more under a write/read condition of 200 Gb/in$^2$. However, in this case, a computer simulation has revealed that ten years later it will go down to 40% of the signal level just after recording. In other words, there exists a trade-off relation between medium noise reduction and thermal stability, and for magnetic recording media it is indispensable to ensure both.

A feature of the present invention is to provide a perpendicular magnetic recording medium which ensures both a high SNR and thermal stability.

The present inventors experimentally manufactured perpendicular magnetic recording media with different structures under different conditions, made examinations by computer simulation and analyzed their fine structures through a transmission electron microscope and as a result of such constant efforts, have found that control of the composition of a granular magnetic recording layer is important in order to achieve a high SNR and thermal stability. Furthermore, it has been found that a high SNR and thermal stability can be achieved when the grain boundary layer of the granular magnetic recording layer contains a ferromagnetic element in a given percentage. The ratio of ferromagnetic element in the grain boundary layer must be in the range from about 30 at. % to 50 at. % in terms of atomic percent with respect to the solid element which constitutes the grain boundary layer, and preferably from about 35 at. % to 47 at. %.

According to the present invention, a magnetic recording medium with a high medium S/N and a high thermal stability can be provided by controlling the composition of the grain boundary layer of the magnetic recording layer consisting of columnar magnetic crystal grains and a grain boundary layer so as to ensure moderate intergrain exchange interaction.

DETAILED DESCRIPTION OF THE INVENTION

Figure 1:
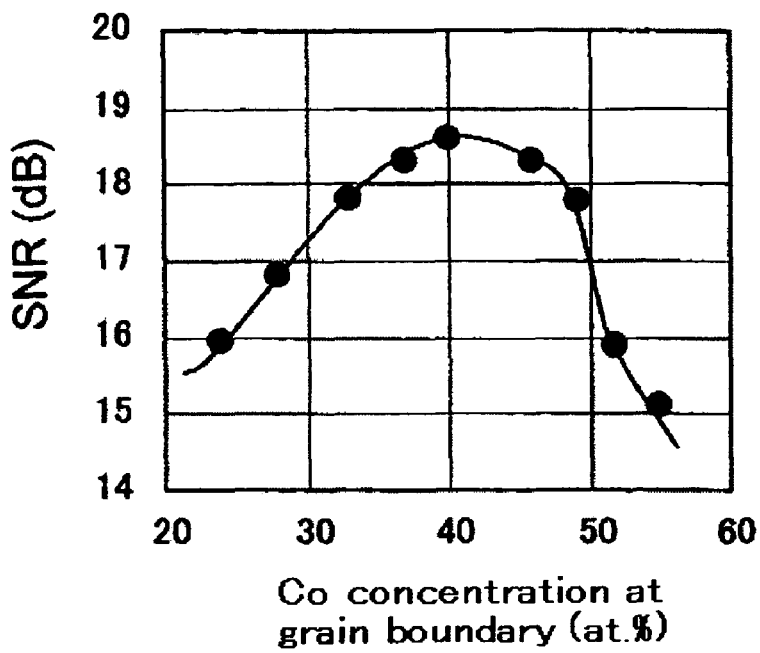
FIG. 1 is a graph which plots medium SNR against Co concentration in the grain boundary layer.
Figure 2:
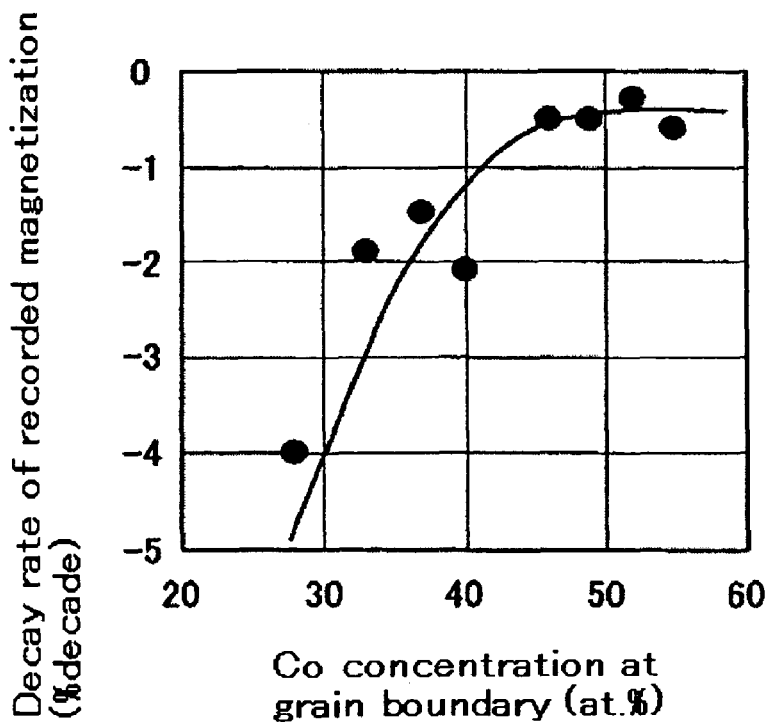
FIG. 2 is a graph which plots the decay rate of recorded magnetization against Co concentration in the grain boundary layer.

FIG. 1 shows the result of actual write/read operation on a perpendicular magnetic recording medium which has a magnetic recording layer made of CoCrPt alloy and Si oxide. In the graph, the horizontal axis represents Co concentration (atomic percent) obtained by dividing the amount of Co atoms by the sum of Co, Cr, Pt and Si atoms and the vertical axis represents the value of SNR in write/read operation at 400 kfci. Similarly, FIG. 2 is a graph which shows the decay rate of recorded magnetization against the Co concentration at grain boundary.

From FIG. 1, it is known that there is a peak SNR in write/read operation against the Co concentration at grain boundary and particularly that S/N is above 17 dB in the Co concentration range from about 30% to 50% and above 18 dB in the Co concentration range from about 35% to 47%. Also, from FIG. 2, it is known that the decay rate of magnetization is below 5% when the Co concentration at grain boundary is above about 30%, and the decay rate of magnetization is below 3% when the Co concentration is above about 35%. In other words, both a high S/N and thermal stability can be ensured and the above object can be achieved when the ratio of ferromagnetic element in the grain boundary layer, namely Co, against the overall amount of solid elements is in the range from about atomic percent 30% to 50% or preferably from about 35% to 47%. Here, a "solid element" means an element which is solid at ambient temperatures and elements which are gases at ambient temperatures, such as oxygen, nitrogen and argon, are excluded. The reason is that if the magnetic recording layer contains, for example, Si oxide, the oxygen included in the Si oxide, which is not solid but bonded to Si, is considered as the silicon oxide and thus a Co concentration can be defined as a ratio to solid elements.

Figure 3:
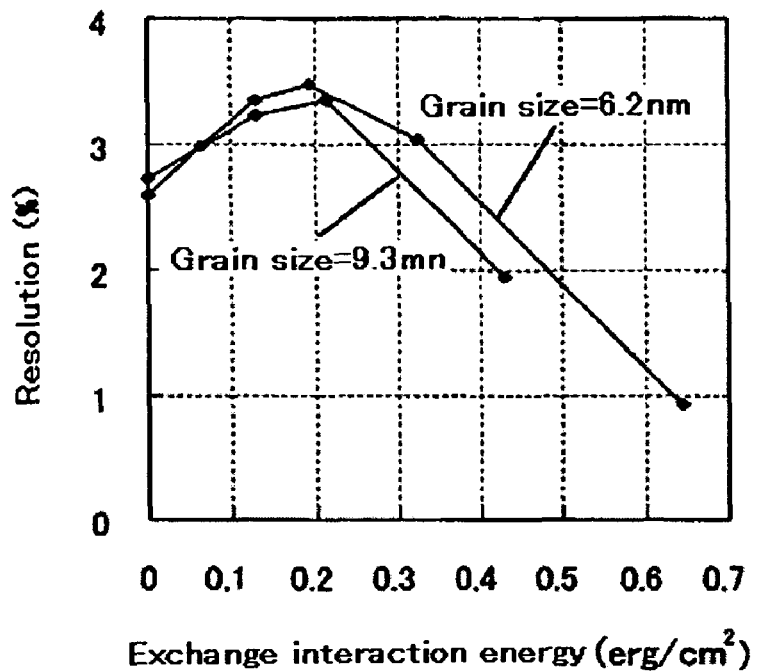
FIG. 3 is a graph which plots resolution against intergrain exchange interaction energy as calculated by computer simulation.
Figure 4:
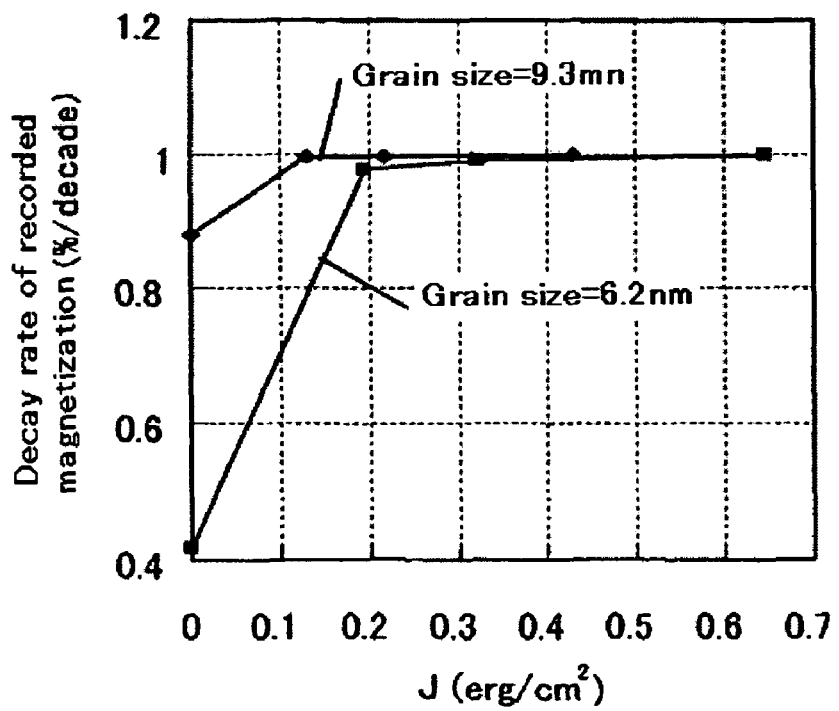
FIG. 4 is a graph which plots the decay rate against intergrain exchange interaction energy as calculated by computer simulation.

Next, a description will be made of the result of examination of magnetic properties which was made in detail based on computer simulation in order to explain why the write/read performance is improved when the grain boundary layer contains a ferromagnetic element such as Fe, Ni or Co. FIG. 3 is a graph which plots resolution (read output at linear recording density of 1362 kfci is divided by the maximum read output at low recording density) against intergrain exchange interaction energy J (intergrain exchange stiffness constant is divided by the sum of grain size and grain boundary width and doubled; the energy corresponds to intergrain magnetic bonding strength). From the figure, it is known that the resolution is the maximum when the exchange interaction energy is around 0.2 erg/cm$^2$. In other words, when grains are magnetically bonded to each other in a moderate way, the performance is expected to improve. FIG. 4 shows the relation between exchange interaction energy J and decay rate of read signals over time. It is found that as the exchange interaction energy J becomes smaller than 0.2 erg/cm$^2$, the signal decay rate abruptly increases. The result of examination indicates that introduction of moderate exchange interaction permits both write/read performance and thermal stability. It can be considered that when grains are moderately coupled to each other, magnetization reversal of individual grains is suppressed, which improves thermal stability and enables improvement in resolution due to suppression of formation of reverse magnetic domains in write bits.

Since the influence of intensive exchange interaction is strong between ferromagnetic elements, it is considered that the intensity of exchange interaction can be controlled by inclusion of a ferromagnetic element in the grain boundary layer. The intergrain exchange interaction energy J is several times larger than 0.2 erg/cm$^2$, so that it can be thought that inclusion of ferromagnetic element in the grain boundary layer in a lower concentration than the concentration in grains generates moderate intergrain exchange interaction energy, resulting in the appearance of a peak in magnetic property as shown in FIG. 1.

Figure 5:
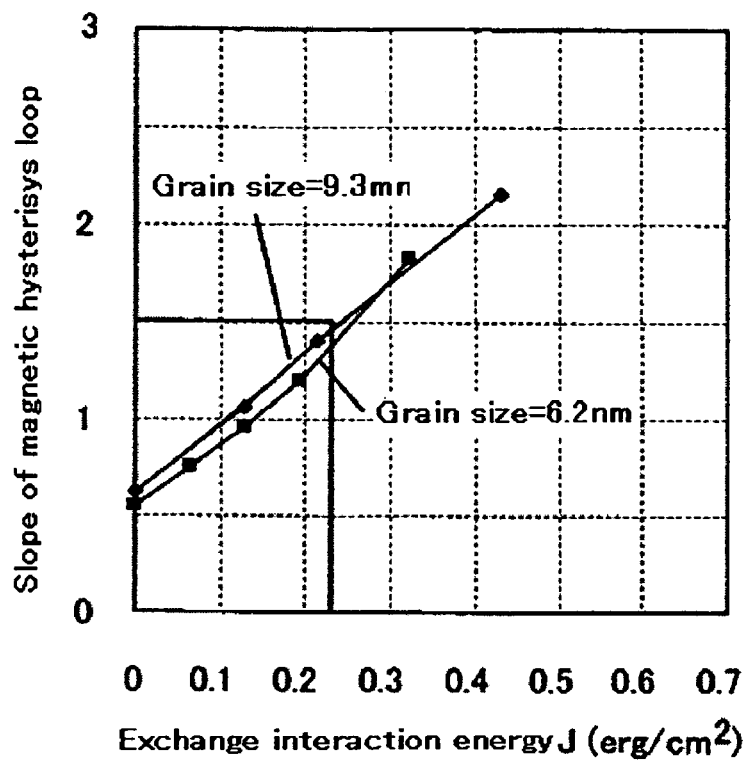
FIG. 5 is a graph which plots the slope of magnetic hysteresis loop against intergrain exchange interaction energy as calculated by computer simulation.

For more quantitative analysis, comparison was made between the result of computer simulation and actual measurements of magnetic hysteresis loops. Although it is impossible to measure the value of exchange interaction energy directly, it is possible to make an estimation from the slope of a magnetic hysteresis loop. The magnetic hysteresis loop slope is largely affected by intergrain exchange interaction energy and dispersion of magnetic anisotropy field for each grain. The dispersion of the magnetic anisotropy field employed in the computer simulation is about 20-30%, which well agrees with the dispersion of magnetic anisotropy field as calculated from dispersion of composition of each grain. In other words, when the slope of a magnetic hysteresis loop as calculated with exchange interaction energy as a parameter is compared with the actually measured magnetic hysteresis loop slope, the value of exchange interaction energy can be quantitatively estimated. FIG. 5 shows the slope of magnetic hysteresis loop in the vicinity of coercivity against exchange interaction energy J as calculated by computer simulation. In a magnetic recording medium according to an embodiment of the present invention, the magnetic hysteresis loop slope is about 1.5 and thus the exchange interaction energy J is estimated to be about 0.2-0.3 erg/cm$^2$. This agrees with the result that the magnetic property improves when the exchange interaction energy is around 0.2 erg/cm$^2$ and can be quantitatively well explicable.

Figure 6:
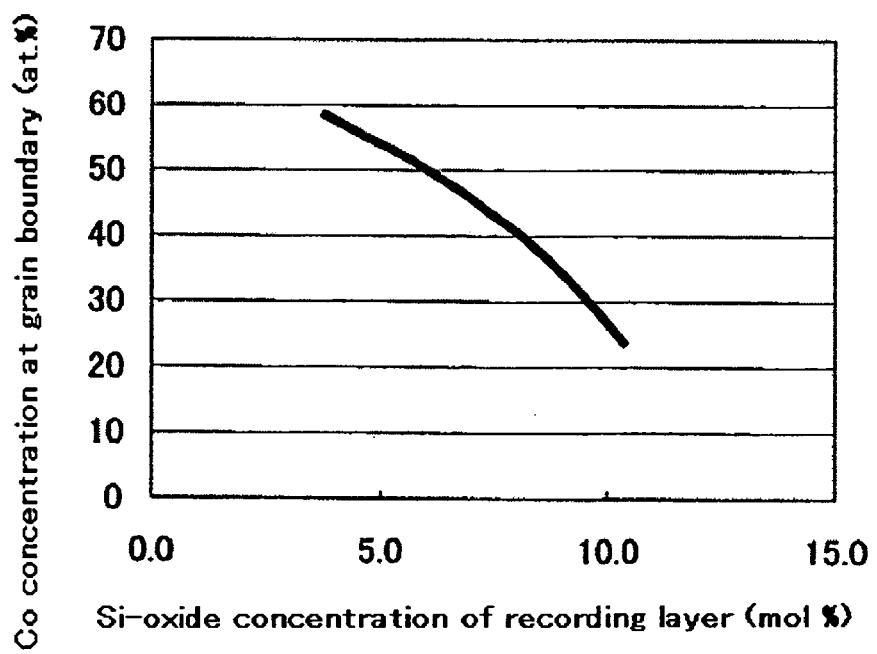
FIG. 6 is a graph which shows the relation between Si oxide concentration in the magnetic recording layer and Co concentration in the grain boundary layer.

Next, a method of controlling the Co concentration in the grain boundary layer will be described. The Co concentration can be controlled by adjusting the grain boundary width and the Si oxide concentration in the magnetic recording layer at the same time. For example, when deposition was made at a sputter gas pressure of 2 Pa and a substrate temperature of 60° C. by the use of a sputtering apparatus under the condition that the grain boundary width was 1.1 nm and 8 mol of Si oxide were included in the magnetic recording layer, the Co concentration in the grain boundary layer was 45%. When the grain boundary width is broadened by increasing the oxygen concentration in the sputter gas for deposition without change in the Si oxide concentration in the magnetic recording layer, the Co concentration in the grain boundary layer increases. The grain boundary width can also be broadened by increasing the Ar gas pressure for deposition. The Si oxide concentration in the magnetic recording layer can also be controlled by applying bias voltage to the substrate. For example, when a negative bias voltage is applied, the Si oxide concentration in the magnetic recording layer is increased. FIG. 6 shows Co concentrations when the grain boundary width is kept at 1.1 nm and the Si oxide concentration in the magnetic recording layer is varied, as an example of control of Co concentration in the grain boundary layer.

A method of measuring the ferromagnetic element concentration at grain boundary using a transmission electron microscope (TEM) is explained here. An explanation is given below concerning how to measure the amount of Co as an element in the grain boundary layer using the transmission electron microscope used to obtain the above Co concentration, taking a case of measurement of a granular magnetic recording layer made of CoCrPt alloy and Si oxide as an example. First, how to define a grain boundary is described. A plan view TEM image of a magnetic recording layer consists of: a crystal grain region where a lattice image is observed when a hexagonal closed pack structure crystal is viewed along the 0 0 1 direction; and a substantially amorphous grain boundary layer formed in a way to surround it. When the magnetic recording layer region is observed along the cross-sectional direction, crystal grains look columnar and the thickness of the amorphous grain boundary layer is almost constant in the film thickness direction. The location of the grain boundary layer can be determined using a bright field plan view TEM image and a high diffraction contrast region corresponds to a crystal grain region and a low diffraction contrast region corresponds to an amorphous region or a grain boundary layer. When the mid-value of contrast of the plan view TEM image is taken as a threshold and binarization is done, an image of the grain boundary region only can be obtained and this region is defined as a grain boundary layer. In this connection, an image of only the magnetic crystal grain region can be obtained at the same time and an average crystal grain size can be calculated using this image. An average crystal grain size is defined by calculating the areas of individual grains and making an arithmetic average of more than 100 grain sizes defined as diameters of circles whose areas are the same as the calculated areas. The average thickness of the grain boundary layer is defined as the difference between the average grain size measured on the assumption that there is a grain boundary in the center of the grain boundary layer, and the average crystal grain size as calculated by the above method without including the grain boundary layer.

Using the image of the grain boundary layer only, the amount of an element is quantified by an element distribution measuring method explained below. For reference's sake, the thickness of the grain boundary layer remains almost unchanged even when the amount of Si oxide is varied in the range from 15% to 25% by volume.

The in-plane distribution of elements included in the magnetic recording layer can be obtained from a composition distribution image based on energy loss spectroscopy. The magnetic recording medium is thinned from the substrate side and as an electron beam enters the resulting sample, which only consists of a magnetic recording layer and a protective layer, it excites the element in the sample, causing element-specific energy loss. The electron beam which has passed through the sample is spatially dispersed by an electromagnet to extract electron rays with a specific energy to obtain electron rays which have lost energy for a specific element. The electron rays are again focused to obtain an element distribution image. After an element distribution image for the element constituting the magnetic recording layer is obtained, it is compared with the plan view TEM image of the grain boundary layer only and thus the element constituting the grain boundary layer is quantitatively identified and extracted. In other words, when the composition distribution image is masked through the image of the grain boundary layer, a composition distribution image of the grain boundary layer only is obtained and the grain boundary composition can be quantified.

Regarding the size of regions used for the above measurement through the transmission electron microscope, it is desirable to use a plurality of regions so as to cover at least 100 magnetic crystal grains and take the average. The reason is that if only a region including less than 100 magnetic crystal grains should be used, a statistical measurement error would be significant. Regarding the point of measurement, it is desirable to make a measurement at the most inner circumferential part of the magnetic disk where record is written. The reason is that write bits are relatively small in the inner circumference of the magnetic disk where the requirements for SNR and thermal stability are most severe.

Figure 7:
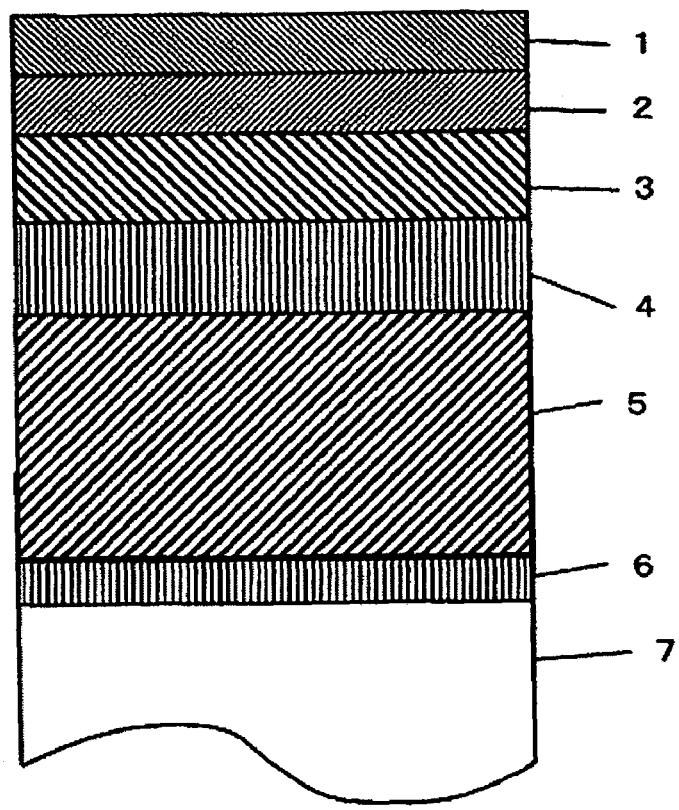
FIG. 7 is a drawing which shows the structure of a perpendicular magnetic recording medium according to an embodiment of the present invention.
Figure 8:
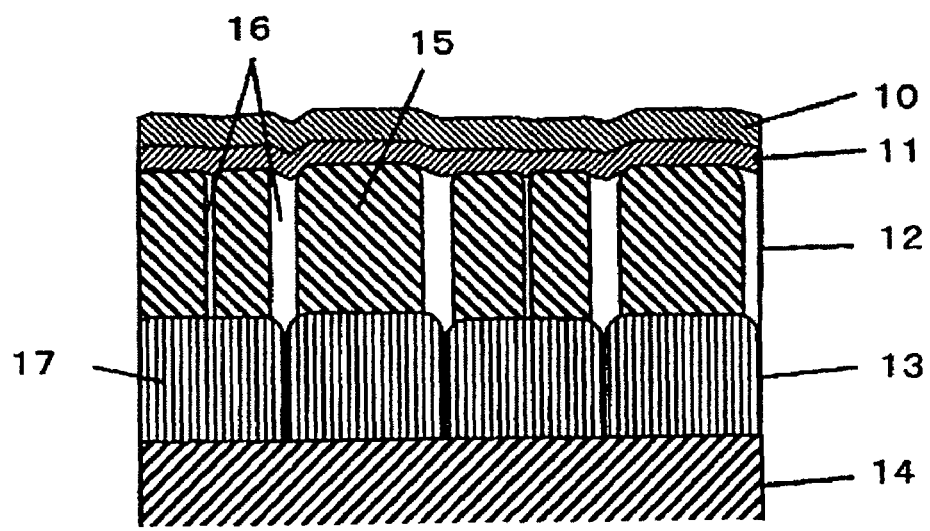
FIG. 8 is a drawing which shows a cross section of a recording layer of a perpendicular magnetic recording medium according to an embodiment of the present invention.

The structure of a magnetic recording medium according to an embodiment of the present invention is shown in FIGS. 7 and 8. FIG. 7 is a sectional view of the structure of a perpendicular magnetic recording medium according to the present embodiment. Formed over a disk substrate 7 are an adhesion layer 6, a soft magnetic layer 5, a non-magnetic undercoat layer 4, a granular magnetic recording layer with perpendicular magnetic anisotropy 3, a protective layer 2 and a lubricating layer 1. These layers may be formed on both sides of the disk substrate 7. Among the above layers, the adhesion layer 6, soft magnetic layer 5, undercoat layer 4 and magnetic recording layer 3 can be formed using a sputtering apparatus. The protective layer 2 can be formed by a sputtering process, an ion beam process, or a CVD process. The lubricating layer 1 can be formed by a dipping process or spin coating process. The layers except the magnetic recording layer 3 may be formed by other means unless their magnetic, mechanical and chemical properties are significantly deteriorated. For example, the soft magnetic layer 5 may also be formed by a plating process.

The substrate 7 may be a Ni—P-plated Al substrate, a chemically surface strengthened glass substrate, or a crystallized glass substrate. Also, it may be made of another non-magnetic material which is excellent in surface flatness and, when heated to 300° C. or so, it is not magnetized nor deformed. For example, it may be a Si substrate or SiC substrate. The surface of the substrate may be polished to attain an average roughness of below 3 nm or finely grooved (textured) in the disk circumferential direction.

The adhesion layer 6 is used to improve the degree of adhesion between the substrate and the soft magnetic layer 5 and also increase the bearing resistibility of the magnetic head and also to suppress chemical action between the substrate and the soft magnetic layer and element diffusion. For example, an alloy such as Cr, NiTa, NiTaZr, CrTi, CrTiTa or TiAl can be used. Another non-magnetic layer may be used as far as it achieves the above object. Unless deterioration in bearing resistibility or element diffusion is significant, the adhesion layer may be omitted.

The soft magnetic layer 5 is made of a material which demonstrates a low coercivity and a soft magnetic property. For example, an alloy such as CoTaZr, FeTaC, FeAlSi, CoFeB or NiFe or a laminate of these may be used. Another material may be used similarly as far as it demonstrates a soft magnetic property and provides a saturation flux density of 1T or more. The soft magnetic layer may be combined with a magnetic domain control layer to orient its magnetization along the disk radial direction uniformly. For example, the orientation of magnetization of the soft magnetic layer can be fixed by inserting an anti-ferromagnetic material (FeMn, IrMn, MnPt, or CrMnPt) layer coated with a ferromagnetic layer (CoFe or NiFe) into the bottom, middle or top of the soft magnetic layer and heating it and then cooling it under the condition that a magnetic field in the disk radial direction is applied. Also the orientation of magnetization can be fixed by dividing the soft magnetic layer into plural layers by non-magnetic layers of about 1 nm and joining them in a way to let magnetization of layers be anti-parallel. Since the soft magnetic layer is mainly used as a return path for the magnetic head, its thickness is sufficient if a magnetic flux from the head can pass through it. For example, if a CoTaZr soft magnetic layer is used, it provides satisfactory performance when its thickness is about 200 nm.

The undercoat layer 4 is made of a non-magnetic material composed of substantially columnar crystal grains. Because the undercoat layer is used to control the crystal orientation of the magnetic recording layer formed over it, if the magnetic recording layer has the hcp structure, it is desirable that the top surface of the undercoat layer 4 has the hcp structure and its preferred orientation is [0 0 1]. The materials which may be used here include Ru and its alloys, Co and its alloys, and Ti and its alloys and elements to be added to make alloys include Ru, Cr, B, V, Zr, Mo and W. By using an alloy, the lattice constant can be varied and lattice matching with the magnetic recording layer formed over it can be improved. On the other hand, the undercoat layer 4 may be composed of plural layers. For example, a metal layer (oxide such as MgO or Ta) of approximately 1 nm is formed as a first layer for control of the grain size of the undercoat layer 4 and orientation control. Then, at least one layer (Ru, etc) is formed so as to make an hcp structure polycrystalline film which is oriented along the 0 0 1 direction.

Preferably the average size of crystal grains which constitute the undercoat layer 4 should be in the range from about 6 nm to 10 nm. This is because the grain size of magnetic crystal grains made over it should be controlled to make it an appropriate size. The crystal grain size can be controlled by adjusting the substrate temperature, sputter gas pressure and deposition rate, film thickness and so on. Preferably the overall thickness of the undercoat layer 4 should be in the range of about 2-20 nm. If it should be thinner than 2 nm, the degree of crystallinity and degree of crystal orientation of Ru or the like would be insufficient and the degree of crystal orientation of the magnetic recording layer 3 would decline. On the other hand, if it should be thicker than 20 nm, the distance from the magnetic head to the soft magnetic layer 5 would be too large; as a consequence, a strong magnetic field from the magnetic head could not be applied to the magnetic recording layer 3, which might cause overwrite performance deterioration or a failure to increase the medium coercivity might cause a decline in thermal stability of recorded magnetization.

FIG. 8 schematically shows details of a cross section of the magnetic recording layer 3. The magnetic recording layer 12 has a granular structure including virtually columnar magnetic crystal grains 15 and grain boundary layers 16 formed around the crystal grains. The magnetic crystal grains 15 and grain boundary layers 16 can be made with the following procedure: CoCrPt alloy, and CoCrPt alloy added with B, Ta, Cu, Ru, Ti or Si, and oxide such as Si, Al, Ti or Mg oxide, or nitride such as Si, Ti or B nitride are deposited together with CoCrPt alloy by sputtering. For instance, a granular magnetic recording layer composed of CoCrPt alloy and Si oxide can be formed using a sputter target as a combination of CoCrPt alloy and Si oxide by the DC magnetron sputter method. It is also possible to make sputter depositions alternately while the CoCrPt alloy sputter target and Si oxide sputter target are rotating.

The magnetic crystal grains 15 have the hcp structure and are in a virtually epitaxial relation with undercoat crystal grains 17 and their preferred orientation is [0 0 1]. The average crystal grain size of the magnetic crystal grains 15 should preferably be above about 5 nm and below about 8 nm. If it should be less than 5 nm, thermal stability would decline and decay of recorded magnetization would be serious. On the other hand, if it should be more than 8 nm, undesirably medium noise would increase. The reason that there is a difference in grain size between the undercoat layer 13 and the magnetic recording layer 12 is that the magnetic recording layer 12 has grain boundary layers of approximately 1-2 nm.

The grain boundary layer 16 has a substantially amorphous structure and is mostly formed just above a grain boundary of undercoat crystal grains 17 but in some case, formed just above undercoat crystal grains 17. The average grain boundary width should preferably be above about 1 nm. The crystal grain size and grain boundary width can be controlled by controlling the sputter Ar gas pressure, oxygen concentration in the Ar gas, input power and so on for the magnetron sputter deposition apparatus.

The film thickness of the magnetic recording layer 12 should preferably be in the range of about 5 nm to 30 nm. This is because if it should be thinner than 5 nm, coercivity deterioration and decline in thermal stability would be significant; and if it should be thicker than 30 nm, the distance between the magnetic head and the soft magnetic layer 14 would increase, which would cause deterioration in recording resolution due to decrease in head field gradients, or deterioration in overwrite performance due to decrease in head field intensity.

The protective layer 11 may be a film whose main component is C. Obviously another material may be used similarly provided that it protects the magnetic recording layer 12 against corrosion. The film thickness of the protective layer 11 should preferably be above about 1 nm and below about 5 nm. This is because if it should be below 1 nm, protection would be insufficient when the head collides against the medium surface; and if it should be above 5 nm, the distance between the magnetic head and the medium would increase, which would cause deterioration in recording resolution. The lubricating layer 10 may be made of a perfluoroalkyl polyether material.

The following describes specific embodiments and comparative examples of the recording media. First, a 30 nm thick film of NiTa37.5 was deposited on an alkali-cleaned, chemically strengthened glass substrate (surface roughness 0.2 nm) at an Ar gas pressure of 1 Pa by sputtering. Numerals "37.5" in NiTa37.5 represent a Ta concentration in the film as expressed in atomic percent. In other words, NiTa37.5 is an abbreviation for 62.5 at. % Ni-37.5 at. % Ta. In this document, when element symbols with no numerals (for example, NiTa) are an abbreviation for a compound which is the same in composition ratio as the film containing the same element as described just before it. Similar abbreviations will be used hereinafter. Next, a 200 nm thick film of CoTa3Zr5 was formed at an Ar gas pressure of 0.5 Pa and a 1 nm thick film of Ta was formed at an Ar gas pressure of 2 Pa. Then, heating up to approximately 200° C. was done by a lamp heater and cooling down to approximately 60° C. was done in a magnetic field. The magnetic field (4 kA/m to 8 kA/m) was applied along the disk substrate radial direction from the center of the substrate. After that, a 20 nm thick Ru film was formed at an Ar gas pressure of 2.0 Pa. At that time, the substrate temperature was below 60° C. Next, a magnetic recording layer was formed using a CoCr17Pt14-SiO$_2$ combination target by sputtering. This deposition was made at an Ar gas pressure of 2.0 Pa by sputtering and the film thickness was 18 nm. During formation of the magnetic recording layer, the substrate was not heated and bias was not applied to the substrate. After that, a 3 nm thick film of C was deposited as a protective film at an Ar gas pressure of 1 Pa.

For evaluation of the write/read characteristics of the magnetic recording medium thus made, a merged magnetic head which consists of a read element with a shield gap length of 62 nm and a track width of 120 nm based on giant magnetoresistance and a single-pole write element with a track width of 150 nm was used. Read output and noise were measured at a rotating velocity of 10 m/s, a skew angle of 0 degree, and a magnetic spacing of approximately 15 nm. The medium SNR was evaluated in terms of solitary wave read output at a linear recording density of 50 kFCI and the medium's noise ratio at a linear recording density of 400 kFCI. The recording resolution was evaluated in terms of a ratio of read output at a linear recording density of 400 kFCI to read output at a linear recording density of 50 kFCI.

Table 1 shows write/read characteristics and magnetostatic characteristics of media as embodiments of the present invention and media as comparative examples where the Co concentrations of the embodiment media were from about 30% to 50% and those of the media as comparative examples were less than 30% or more than 50%. Control of Co concentrations in the magnetic recording layers were done by changing the mole ratio of CoCrPt and SiO$_2$ included in the sputter target in advance. The grain boundary width was almost constantly in the range from 1.0 nm to 1.1 nm for all the embodiment media and comparative example media.

TABLE 1

|  | Co concentration at grain boundary (at. %) | Coercivity (kOe) | Slope of magnetic hysteresis loop | Medium SNR (dB) | Decay rate (%/decade) |
|---|---|---|---|---|---|
| Embodiment 1 | 33 | 3.9 | 1.5 | 17.8 | −1.9 |
| Embodiment 2 | 37 | 4.5 | 1.5 | 18.3 | −1.5 |
| Embodiment 3 | 40 | 4.8 | 1.4 | 18.6 | −2.1 |
| Embodiment 4 | 46 | 5.2 | 1.7 | 18.3 | −0.5 |
| Embodiment 5 | 49 | 5.3 | 1.7 | 17.9 | −0.5 |
| Comparative example 1 | 23 | 3.0 | 1.5 | 16.0 | −10.5 |
| Comparative example 2 | 28 | 3.2 | 1.4 | 16.8 | −4.0 |
| Comparative example 3 | 52 | 5.4 | 1.9 | 15.9 | −0.3 |
| Comparative example 4 | 55 | 5.4 | 2.0 | 15.1 | −0.6 |

As apparent from Table 1, in case of the media as embodiments of the present invention, the maximum media SNR was demonstrated when the Co concentration in the grain boundary layer was approximately 40% and SNR was high when it was in the range from about 30% to 50%. On the other hand, in case of the magnetic recording media as comparative examples, SNR sharply declined. The table also shows that the decay rate of recorded magnetization was as low as below 3% when the Co concentration was more than 30%, while it was as high as above 4% when the Co concentration was less than 30%. Regarding the coercivity and the slope of magnetic hysteresis loop which were measured by a vibrating sample magnetometer, no maximization in the characteristics was observed though simple changes with increase in Co concentration were observed. These results can be interpreted that because the concentration of Co, a ferromagnetic element, included in the grain boundary layer was from about 30% to 50%, adequate exchange interaction took place between grains and thus both improvement in SNR and thermal stability were achieved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A perpendicular magnetic recording medium including a soft magnetic layer, a non-magnetic intermediate layer, and a magnetic recording layer disposed on a substrate, said magnetic recording layer having a granular structure in which crystal grains are separated by grain boundary layers, wherein a grain boundary layer in said magnetic recording layer contains a ferromagnetic element, and wherein said crystal grains have a substantially columnar structure and have a magnetic easy axis substantially perpendicular to a substrate surface of said substrate, wherein an adhesion layer comprising an alloy selected from NiTa, NiTaZr, CrTi, CrTiTa, or TiAl, is present between the substrate and the soft magnetic layer, wherein a ratio of the ferromagnetic element in said grain boundary layer is 30 at. % or more and 50 at. % or less in atomic percent with respect to a solid element which constitutes said grain boundary layer.

2. The perpendicular magnetic recording medium as claimed in claim 1, wherein said crystal grains have a substantially columnar structure and in an epitaxial relation with the non-magnetic intermediate layer, and have a magnetic easy axis substantially perpendicular to a substrate surface of said substrate.

3. The perpendicular magnetic recording medium as claimed in claim 1, wherein said substrate is a disk substrate and a ratio of the ferromagnetic element included in said grain boundary layer is a value measured at the most inner circumferential part of the disk where recording is done.

4. The perpendicular magnetic recording medium as claimed in claim 1, wherein the ratio of the ferromagnetic element included in said grain boundary layer is about 35 at. % or more and about 47 at. % or less in atomic percent with respect to a solid element which constitutes said grain boundary layer.

5. The perpendicular magnetic recording medium as claimed in claim 4, wherein said substrate is a disk substrate and the ratio of the ferromagnetic element included in said grain boundary layer is a value measured at the most inner circumferential part of the disk where recording is done.

6. The perpendicular magnetic recording medium as claimed in claim 1, wherein said crystal grains are made of CoCrPt alloy or an alloy whose main component is CoCrPt, and the ferromagnetic element included in said grain boundary layer is Co.

7. The perpendicular magnetic recording medium as claimed in claim 1, wherein said magnetic recording layer is mainly composed of CoCrPt alloy and Si oxide.

8. The perpendicular magnetic recording medium as claimed in claim 7, wherein said crystal grains are made of CoCrPt alloy or an alloy whose main component is CoCrPt, and the ferromagnetic element included in said grain boundary layer is Co.

9. The perpendicular magnetic recording medium as claimed in claim 1, wherein said magnetic recording layer is composed of crystal grains having a hexagonal closed pack structure, and a substantially amorphous grain boundary layer.

10. The perpendicular magnetic recording medium as claimed in claim 1, wherein an average crystal grain size of said crystal grains of said magnetic recording layer is about 5-8 nm.

11. The perpendicular magnetic recording medium as claimed in claim 1, wherein an average grain boundary width of said grain boundary layers of said magnetic recording layer is above about 1 nm.

12. The perpendicular magnetic recording medium as claimed in claim 1, wherein said magnetic recording layer is about 5-30 nm in thickness.

13. The perpendicular magnetic recording medium as claimed in claim 1, wherein an average size of crystal grains of said non-magnetic intermediate layer is about 6-10 nm.

14. The perpendicular magnetic recording medium as claimed in claim 1, wherein said non-magnetic intermediate layer is about 2-20 nm in thickness.

15. The perpendicular magnetic recording medium as claimed in claim 1, wherein said non-magnetic intermediate layer comprises a metal layer and an Ru layer.

16. The perpendicular magnetic recording medium as claimed in claim 15, wherein said metal layer is about 1 nm in thickness.

17. The perpendicular magnetic recording medium as claimed in claim 1, further comprising a protective layer disposed on said magnetic recording layer.

18. The perpendicular magnetic recording medium as claimed in claim 17, wherein said protective layer is mainly composed of C.

19. The perpendicular magnetic recording medium as claimed in claim 17, wherein said protective layer is about 1-5 nm in thickness.

* * * * *